US009787757B2

(12) United States Patent
Yu

(10) Patent No.: US 9,787,757 B2
(45) Date of Patent: *Oct. 10, 2017

(54) IDENTIFICATION OF CONTENT BY METADATA

(71) Applicant: DELL SOFTWARE INC., Round Rock, TX (US)

(72) Inventor: Sijie Yu, Sunnyvale, CA (US)

(73) Assignee: SonicWall Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,872

(22) Filed: Nov. 22, 2016

(65) Prior Publication Data

US 2017/0142050 A1    May 18, 2017

Related U.S. Application Data

(63) Continuation of application No. 14/987,698, filed on Jan. 4, 2016, now Pat. No. 9,501,576, which is a continuation of application No. 14/581,717, filed on Dec. 23, 2014, now Pat. No. 9,231,767, which is a continuation of application No. 14/071,192, filed on Nov. 4, 2013, now Pat. No. 8,918,870, which is a continuation of application No. 12/715,337, filed on Mar. 1, 2010, now Pat. No. 8,578,485, which is a continuation-in-part of application No. 12/651,327, filed on Dec. 31, 2009, now Pat. No. 8,578,484.

(60) Provisional application No. 61/228,612, filed on Jul. 26, 2009, provisional application No. 61/142,086, filed on Dec. 31, 2008.

(51) Int. Cl.
  H04L 29/06 (2006.01)
  H04L 29/08 (2006.01)
  G06F 17/30 (2006.01)

(52) U.S. Cl.
  CPC ........ H04L 67/06 (2013.01); G06F 17/30011 (2013.01); G06F 17/30598 (2013.01); G06F 17/30867 (2013.01)

(58) Field of Classification Search
  CPC ..................................................... G06F 21/32
  See application file for complete search history.

(56) References Cited

U.S. PATENT DOCUMENTS 6,161,130 A   12/2000  Horvitz et al.
7,472,163 B1  12/2008  Ben-Yoseph et al.
(Continued)

OTHER PUBLICATIONS

Cappelli et al., "Fingerprint Classification by Directional Image Partitioning", IEEE, vol. 21, No. 5, May 1999. pp. 402-421.
(Continued)

Primary Examiner — Ali Shayanfar
(74) Attorney, Agent, or Firm — Polsinelli LLP

(57) ABSTRACT

Systems and methods for identifying content in electronic messages are provided. An electronic message may include certain content. The content is detected and analyzed to identify any metadata. The metadata may include a numerical signature characterizing the content. A thumbprint is generated based on the numerical signature. The thumbprint may then be compared to thumbprints of previously received messages. The comparison allows for classification of the electronic message as spam or not spam.

20 Claims, 4 Drawing Sheets

(56) References Cited

U.S. PATENT DOCUMENTS

| | | | |
|---|---|---|---|
| 7,574,409 B2* | 8/2009 | Patinkin | H04L 51/12 706/12 |
| 7,792,846 B1 | 9/2010 | Raffill et al. | |
| 8,214,437 B1 | 7/2012 | Alspector et al. | |
| 8,290,203 B1 | 10/2012 | Myers et al. | |
| 8,578,484 B2 | 11/2013 | Yu | |
| 8,578,485 B2 | 11/2013 | Yu | |
| 8,918,870 B2 | 12/2014 | Yu | |
| 9,077,674 B2 | 7/2015 | Yu | |
| 9,087,324 B2* | 7/2015 | Osipkov | G06Q 10/107 |
| 9,177,293 B1* | 11/2015 | Gagnon | G06Q 10/107 |
| 9,231,767 B2 | 1/2016 | Yu | |
| 9,501,576 B2 | 11/2016 | Yu | |
| 2002/0196942 A1* | 12/2002 | Werner | G06F 21/64 380/258 |
| 2003/0065922 A1 | 4/2003 | Fedlund et al. | |
| 2003/0095550 A1 | 5/2003 | Lewis et al. | |
| 2004/0003283 A1 | 1/2004 | Goodman et al. | |
| 2004/0181585 A1* | 9/2004 | Atkinson | G06Q 10/107 709/206 |
| 2005/0015457 A1* | 1/2005 | Warasawa | H04L 63/0428 709/207 |
| 2005/0060643 A1* | 3/2005 | Glass | G06F 17/241 715/205 |
| 2005/0120019 A1 | 6/2005 | Rigoutsos et al. | |
| 2006/0036693 A1 | 2/2006 | Hulten et al. | |
| 2006/0075504 A1 | 4/2006 | Liu | |
| 2006/0095521 A1* | 5/2006 | Patinkin | H04L 51/12 709/206 |
| 2006/0149821 A1 | 7/2006 | Rajan et al. | |
| 2006/0168006 A1 | 7/2006 | Shannon et al. | |
| 2006/0212528 A1* | 9/2006 | Tonegawa | H04L 51/066 709/206 |
| 2006/0235934 A1 | 10/2006 | Wilson et al. | |
| 2008/0091765 A1 | 4/2008 | Gammage et al. | |
| 2008/0143875 A1* | 6/2008 | Scott | H04N 5/222 348/512 |
| 2008/0208966 A1 | 8/2008 | Edwards et al. | |
| 2008/0244009 A1* | 10/2008 | Rand | G06Q 10/107 709/206 |
| 2008/0275957 A1 | 11/2008 | Pouzin et al. | |
| 2009/0030994 A1 | 1/2009 | Usher | |
| 2009/0040215 A1 | 2/2009 | Afzulpurkar et al. | |
| 2009/0055412 A1* | 2/2009 | Cooley | H04L 51/12 |
| 2009/0064233 A1 | 3/2009 | Kondo et al. | |
| 2009/0064323 A1 | 3/2009 | Lin | |
| 2009/0138906 A1* | 5/2009 | Eide | G06F 17/30038 725/32 |
| 2010/0020967 A1 | 1/2010 | Kailash et al. | |
| 2010/0281538 A1 | 11/2010 | Yu | |
| 2010/0299752 A1 | 11/2010 | Yu | |
| 2011/0293135 A1* | 12/2011 | Irons | H04N 1/2166 382/101 |
| 2013/0055088 A1* | 2/2013 | Liao | G06F 3/048 715/730 |
| 2014/0019568 A1 | 1/2014 | Yu | |
| 2014/0059049 A1 | 2/2014 | Yu | |
| 2014/0115495 A1* | 4/2014 | Wetherell | G06F 17/30705 715/752 |
| 2015/0180670 A1 | 6/2015 | Yu | |
| 2016/0117404 A1 | 4/2016 | Yu | |

OTHER PUBLICATIONS

"Identifying Image Spam based on Header and File Properties using C4.5 Decision Trees and Support Vector Machine Learning" (Jun. 2007) Krasser et al.; pp. 255-261 of Proceedings of the 2007 IEEE Workshop on Information Assurance (7 pages total); downloaded from http://www.mcafee.com/us/resources/white-papers/wp-identifying-image-spam.pdf.

Zhijun Liu et., "Detecting and filtering instant messaging spam—A global and personalized approach," Dept. of Comput. Sci. & Eng., Ohio State Univ., Columbus, OH, USA, IEEE, Nov. 2005. pp. 19-24.

U.S. Appl. No. 12/651,327 Final Office Action Oct. 12, 2012.
U.S. Appl. No. 12/651,327 Office Action Jun. 1, 2012.
U.S. Appl. No. 14/034,314 Final Office Action mailed Sep. 16, 2014.
U.S. Appl. No. 14/034,314 Office Action mailed May 29, 2014.
U.S. Appl. No. 12/715,337 Office Action mailed Apr. 5, 2013.
U.S. Appl. No. 12/715,337 Final Office Action mailed Nov. 28, 2012.
U.S. Appl. No. 12/715,337 Office Action mailed Mar. 21, 2012.
U.S. Appl. No. 14/071,192 Office Action mailed Apr. 2, 2014.
U.S. Appl. No. 14/987,698 Office Action mailed Feb. 25, 2016.

* cited by examiner

IDENTIFICATION OF CONTENT BY METADATA

CROSS-REFERENCE TO RELATED APPLICATIONS

The present application is a continuation and claims the priority benefit of U.S. patent application Ser. No. 14/987,698 filed Jan. 4, 2016, issuing as U.S. Pat. No. 9,501,576, which is a continuation and claims the priority benefit of U.S. patent application Ser. No. 14/581,717 filed Dec. 23, 2014, now U.S. Pat. No. 9,231,767, which is a continuation and claims the priority benefit of U.S. patent application Ser. No. 14/071,192 filed Nov. 4, 2013, now U.S. Pat. No. 8,918,870, which is a continuation and claims the priority benefit of U.S. patent application Ser. No. 12/715,337 filed Mar. 1, 2010, now U.S. Pat. No. 8,578,485, which is a continuation-in-part and claims the priority benefit of U.S. patent application Ser. No. 12/651,327 filed Dec. 31, 2009, now U.S. Pat. No. 8,578,484, which claims the priority benefit of U.S. provisional application 61/228,612 filed Jul. 26, 2009 and U.S. provisional application 61/142,086 filed Dec. 31, 2008, the disclosures of which are incorporated herein by reference.

BACKGROUND OF THE INVENTION

Field of the Invention

The present invention generally relates to identification of content by metadata. The present invention more specifically relates to identification of spam content in electronic messages using metadata.

Description of the Related Art

Electronic mail is a commonly used mode of communication. Because electronic mail is relatively easy and inexpensive to use, it has also become a mode of delivering unsolicited, commercial messages (e.g., spam). While various anti-spam applications are available to lessen the impact of these unsolicited, commercial messages, there are a seemingly equal number of means by which the sender of such messages may circumvent such applications.

One application used to combat spam is the identification and quarantining of spam versus legitimate messages that an individual wishes to receive. Some anti-spam applications use "thumbprints" to identify spam; thumbprints are digital signatures used to represent a known spam message. A problem with using thumbprint signatures is that such signatures may be insensitive to changes in the spam.

For example, a signature may be developed for a particular spam message that includes contact information for an advertised service such as a phone number or an e-mail address. But if a portion of the spam message is subsequently altered (e.g., the phone number or the e-mail address is changed), the signature may no longer be useful to identify that message as spam. A spammer who wishes to circumvent such a system may simply alter some aspect of the message, thereby making any previous identifications of that message as spam more, if not wholly, inapplicable. As such, further, proactive identification of such a spam message at different locations may be fruitless.

The alteration may not necessarily have to be extensive to avoid identification. Misspelling or omitting certain words or introducing new information may not change the overall context or intent of the message, but may be more than enough to result in an altered thumbprint signature, making the message otherwise unidentifiable to a particular anti-spam application. As such, 'spammers' often engage in such techniques to circumvent anti-spam applications.

Images appearing in spam messages are particularly difficult to identify and are especially prone to changes. Minor changes to an image may alter the thumbprint signature, but still clearly convey the intended message. Changes to an image may include cropping, resizing, color variation, skewing, and adding random noise. Proposals on how to identify such images notwithstanding such changes have included extracting robust image features and/or using Fourier transformation and wavelet transformations. The success rate of these alternatives is debatable, especially in light of the fact that implementing such alternatives is complicated, time-consuming, and costly. There is a need in the art for identifying content as spam or an otherwise unsolicited and unwanted electronic message.

SUMMARY OF THE PRESENTLY CLAIMED INVENTION

Embodiments of the present invention include methods and systems for identifying content in electronic messages. The content in a received electronic message may be detected and analyzed to identify any metadata. Such metadata may include a numerical signature characterizing the content. For images, such a numerical signature may include dimension and color information. A thumbprint is generated based on the numerical signature. The thumbprint may then be compared to thumbprints of other messages. The comparison allows for retrieval of other electronic message sharing a common thumbprint. These other messages can be classified as spam and/or part of the spam outbreak. In addition, additional thumbprints may be generated for the electronic message based on one or more variations of the numerical signature. The thumbprints may collectively be associated with the message content and its identification as spam.

Methods for identifying content in electronic messages may include receiving an electronic message classified as spam, detecting content in the received electronic message, identifying a numerical signature characterizing the content, determining at least one variation for the numerical signature, generating a thumbprint based on the numerical signature and a thumbprint based on the at least one variation, and storing the thumbprints in a database in memory for comparison to thumbprints of subsequently received messages. The subsequently received message may then be retrieved in a search and classified as spam and/or part of the spam outbreak based on the comparison.

Systems for identifying content in electronic messages may include a memory configured to store a database of thumbprint information associated with each of a plurality of content found in electronic messages previously received and classified as spam, an interface configured to receive an electronic message; and a processor configured to execute instructions to detect content included in the received electronic message, identify metadata for the detected content, the metadata including a numerical signature characterizing the content, generate a thumbprint based on the numerical signature of the metadata, and compare the thumbprint to the thumbprint information stored in the database, wherein the electronic message is retrieved in a search and classified as spam and/or part of the spam outbreak based on the comparison.

In yet another embodiment of the present invention, computer-readable storage media is provided. Embodied on such computer-readable storage media may be a program that is executable by a processor to perform a method for identifying content in electronic messages.

DETAILED DESCRIPTION

Embodiments of the present invention include systems and methods for identifying content in electronic messages. The content in a received electronic message may be analyzed to identify any metadata. Such metadata may include a numerical signature characterizing the content. For images, such a numerical signature may include dimension and color information. A thumbprint is generated based on the numerical signature. Rounding method may also be used to generate a thumbprint with respect to hashing of the numerical signature. The thumbprint may then be compared to thumbprints of previously received messages. The comparison allows for classification of the electronic message as spam or not spam in light of a library of previously generated and classified thumbprints. Additional thumbprints may be generated for the electronic message based on one or more variations of the numerical signature. The additional thumbprints may collectively be associated with the message content and used to search and identify the message and its related content as being spam and/or part of the spam outbreak.

Figure 1:
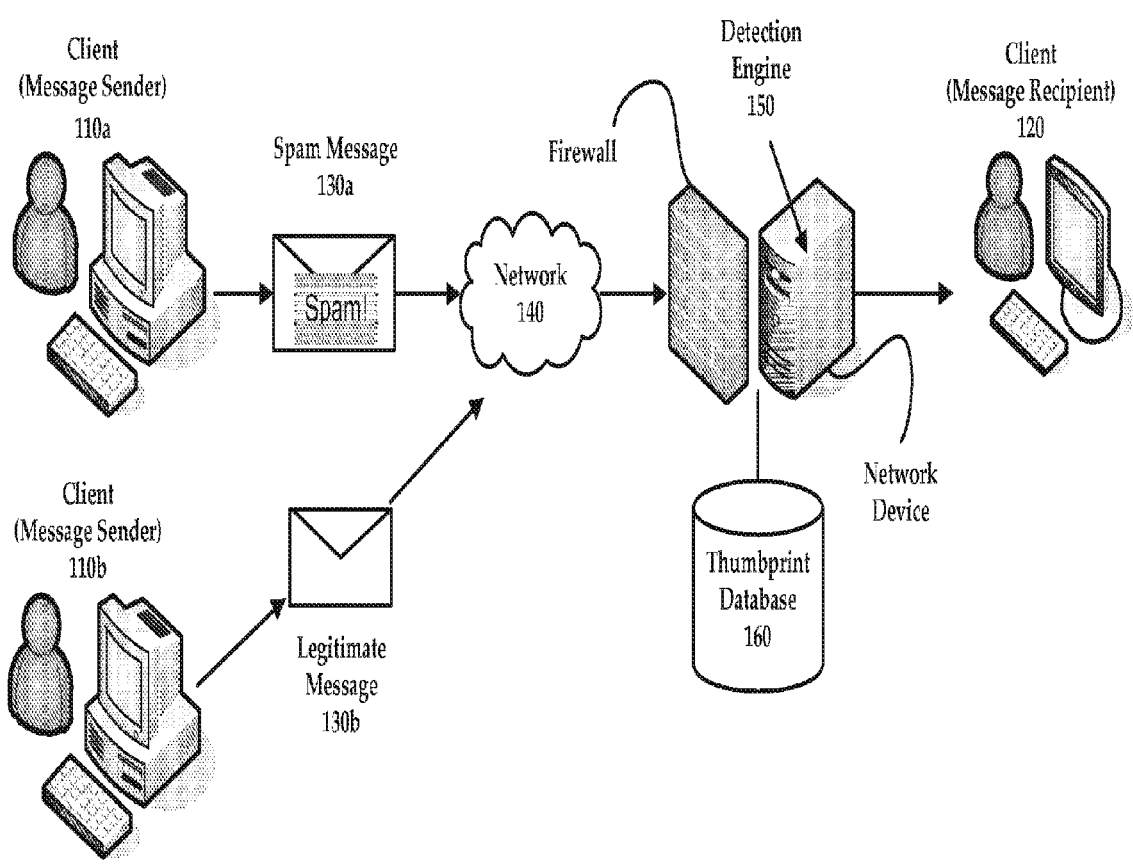
FIG. 1 illustrates a system for identifying content in electronic messages.

FIG. 1 illustrates a system 100 for identifying content in electronic messages. System 100 as illustrated in FIG. 1 includes clients 110a and 110b (message senders, collectively referred to as client 110) and client 120 (message recipient). An image-based electronic message 130a and 130b (collectively referred to as image-based message 130 or message 130) may be sent from clients 110 to client 120 over communication network 140. The image based messages 130 sent by clients 110 may be analyzed by detection engine 150 in conjunction with thumbprint database 160 before the image based messages 130 are delivered to client 120.

Clients 110 and 120 are inclusive of a general purpose computing device capable of accessing information over a communication network 140. Communication network 140 may be a local, proprietary network (e.g., an intranet) and/or may be a part of a larger wide-area network. For example, the communications network 140 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communication network 140 may further be inclusive of an intranet, extranet, private network, or other network.

Clients 110 and 120 may be implemented in workstations, servers, laptop computers, mobile devices, netbooks, or other computing devices that can communicate over communications network 140. Electronic messages sent by a user of client 110 to the user of client 120 may include legitimate exchanges on topics of interest to both the sender and recipient like the image-based message labeled as message 130b. Alternatively, such messages may include unsolicited, commercial messages such as spam that are intentionally or unintentionally sent by user of client 110a to client 120 and as illustrated by message 130a.

As illustrated in FIG. 1, an unsolicited message like message 130a may be visual and/or image-based; a legitimate message such as message 130b may likewise be image-based and/or may include portable document format (PDF), MICROSOFT™ WORD™, EXCEL™, audio, and video file(s). Further examples of an image-based message include other rich media, rich text, and actual images. The image may be in any digital image format, including JPG (joint photographic experts group), BMP (bitmap), PNG (portable network graphics), GIF (graphics interchange format), or TIF (tagged image file). The image in unsolicited image based message 130a (as well as legitimate message 130b) may be associated with metadata.

For example, an image found in unsolicited message 130a may be a PNG image, which refers to a color table. Every pixel in the image refers to an entry in the color table and a particular location in the color table. In addition to color, metadata may also refer to the size dimensions of the image, authors, date created, date modified, and other information. Metadata for an exemplary image may be identified as follows:

| Image width 295 Image height 130 Color size 256 Color Table Entries | | | |
|---|---|---|---|
| Color Index | Red | Green | Blue |
| 0 | 207 | 143 | 114 |
| 1 | 160 | 105 | 82 |
| 2 | 247 | 234 | 216 |
| 3 | 139 | 143 | 141 |
| ... | | | |
| 255 | 11 | 11 | 11 |

While certain aspects of an image in an unsolicited message (130a) may change due to the introduction of random noise or other deliberate and intentional efforts to mask a previously generated thumbprint that may have been generated for the spam image from an anti-spam application and corresponding database of fingerprints, certain metadata may remain the same. For example, a sender of unsolicited image-based message 130a may preserve the message of the spam (e.g., changing "Viagra" to "Viagra" or cropping a pornographic image, which is still identifiable as such after being cropped). There are, however, limits to the extent of changes that a spammer can make to a message or image while still allowing for the message to be identifiable and convey the intent of the same.

Changes to the message are unlikely to change metadata as location of colors or the intensity of colors within the color table. A numerical signature for the image may be determined based on such metadata. For example, a numerical signature of a particular image may be a concatenation of dimensional and/or color values found in the metadata of the image. Such a numerical signature may be common to images in multiple messages originated by a common message sender (e.g., spam outbreaks) over communications network 140.

Detection engine 150 may intercept and examine electronic messages including those having image based message and sent to client 120 over communication network 140. Detection engine 150 may reside in a network device behind or as part of a firewall. The detection engine 150 of the network device determines, based on the examination of the intercepted message, whether the message is spam and/or not spam. Detection engine 150 may also search for electronic messages that are sent over communication network 140.

While spam detection may include various analyses, an exemplary examination of a message 130 received from a message sending client 110 and bound for delivery to the message recipient (client 120) may include detecting content in the message and identifying metadata associated with the content. Such metadata may include various values characterizing an aspect of the content such as dimension, color value, and image type. A numerical signature may then be generated based on the metadata. That numerical signature or thumbprint based on that numerical signature is compared to a database of thumbprints (160) of messages that have been previously identified as spam. Conversely, the database 160 may maintain thumbprints of legitimate messages (i.e., not spam) and allow for a comparison of the same. If there is a match of the newly received message notwithstanding variations to aspects of the content with a thumbprint of a previously identified spam message, the newly received but previously unclassified message may then be classified as spam as well. A margin of error or variation of one thumbprint to another may be allowed before classifying a new message as also being spam.

Thumbprint database 160 stores thumbprints from messages that have been previously identified as spam or, in some instances, messages that have been classified as not spam. When an electronic message is identified as spam by detection engine 150, by a user (e.g., a manual and subsequent identification of a message as spam notwithstanding the fact that it was actually delivered to the client 120 of the recipient), or by another entity (e.g., over a local or global network), the message is analyzed and thumbprinted for addition to the thumbprint database 160. Content is detected in the message, and metadata associated with such content is identified. The metadata may include numerical values characterizing the content. A numerical signature based on such numerical values may be thumbprinted.

In addition to generating a thumbprint based on the numerical signature of the content, variations on the signature may be determined. For example, an image with size dimensions (295, 130) may have variations of (300, 130), (290, 130), and (290, 120). Similar variations may be determined with respect to values characterizing color. For a message identified as spam, not only is the numerical signature thumbprinted, variations on the signature may also be thumbprinted. The resulting thumbprints are then stored in thumbprint database 160 as being associated with spam.

Figure 2:
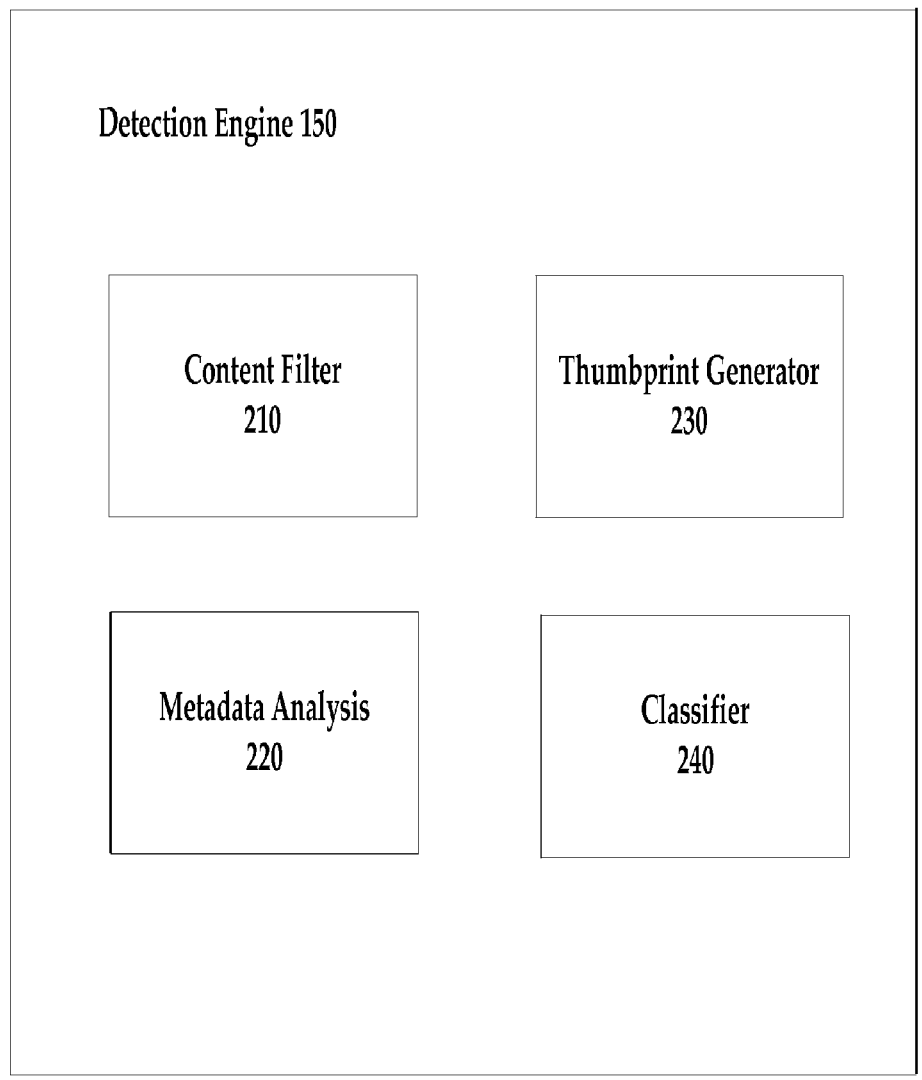
FIG. 2 illustrates a detection engine used for identifying content in electronic messages.

FIG. 2 illustrates a detection engine 150 used for identifying content in electronic messages. The detection engine 150 as illustrated in FIG. 2 includes a content filter 210, a metadata analyzer 220, a thumbprint generator 230, and classifier 240. While illustrated as being part of the detection engine 150, the component applications or modules may be housed separately and/or dynamically loaded and unloaded by hardware and device drivers as required. The components applications may also be incorporated as part of a larger software platform or integrated as part of an application specific component. In any event, the detection engine 150 and its constituent modules are executable by a processor or processors in or accessible to network device.

Content filter 210 is executable by a processor to parse and filter the content of an electronic message 130 received at the network device for processing by the detection engine 150. In an exemplary embodiment, content filter 210 may filter an electronic message 130 for visual and image-based content. Information concerning visual and image-based content may be detected and provided to other components of detection engine 150 for further examination or processing, such as metadata analyzer 220.

Metadata analyzer 220 may be a collection of routines used to extract and/or determine what metadata is associated with certain content. For example, certain formatted images (e.g., PNG) may require specific routines to extract metadata. In some embodiments, metadata analyzer 220 may also provide a numerical signature based on values characterizing the content. An exemplary numerical signature for a piece of image content may be a concatenation of the various numerical values characterizing the image. For messages that are already classified as spam, metadata analyzer 220 may be further executable by the processor to determine one or more variations on the numerical signature. Each value in the numerical signature may or may not be rounded to the nearest integer, multiple of ten. The variations may or may not conform to a specified range relative to the original or rounded values.

Thumbprint generator 230 generates a thumbprint based on the numerical signature of a message and for any variation(s) thereof as determined by metadata analyzer 220. Multiple thumbprints may, therefore, be associated with the same message. A thumbprint may be generated based on any method of compression, including cryptographic or fuzzy hashing. If the message has already been identified as spam, the thumbprints may be provided to thumbprint database 160 for storage and comparison to subsequently received messages.

If a message has not yet been classified, the message may be provided to classifier 240. Classifier 240 is executable by the processor to access thumbprint database 160 and compare the thumbprint(s) generated by thumbprint generator 230 to those associated with identified spam messages or some other classification of message, including not spam. Based on the comparison, classifier 240 may classify the electronic message as spam or not spam. A message identified as not spam may be further processed and/or delivered to client 120. A message identified as spam (or not spam) may have its thumbprint(s) added to thumbprint database 160.

Figure 3:
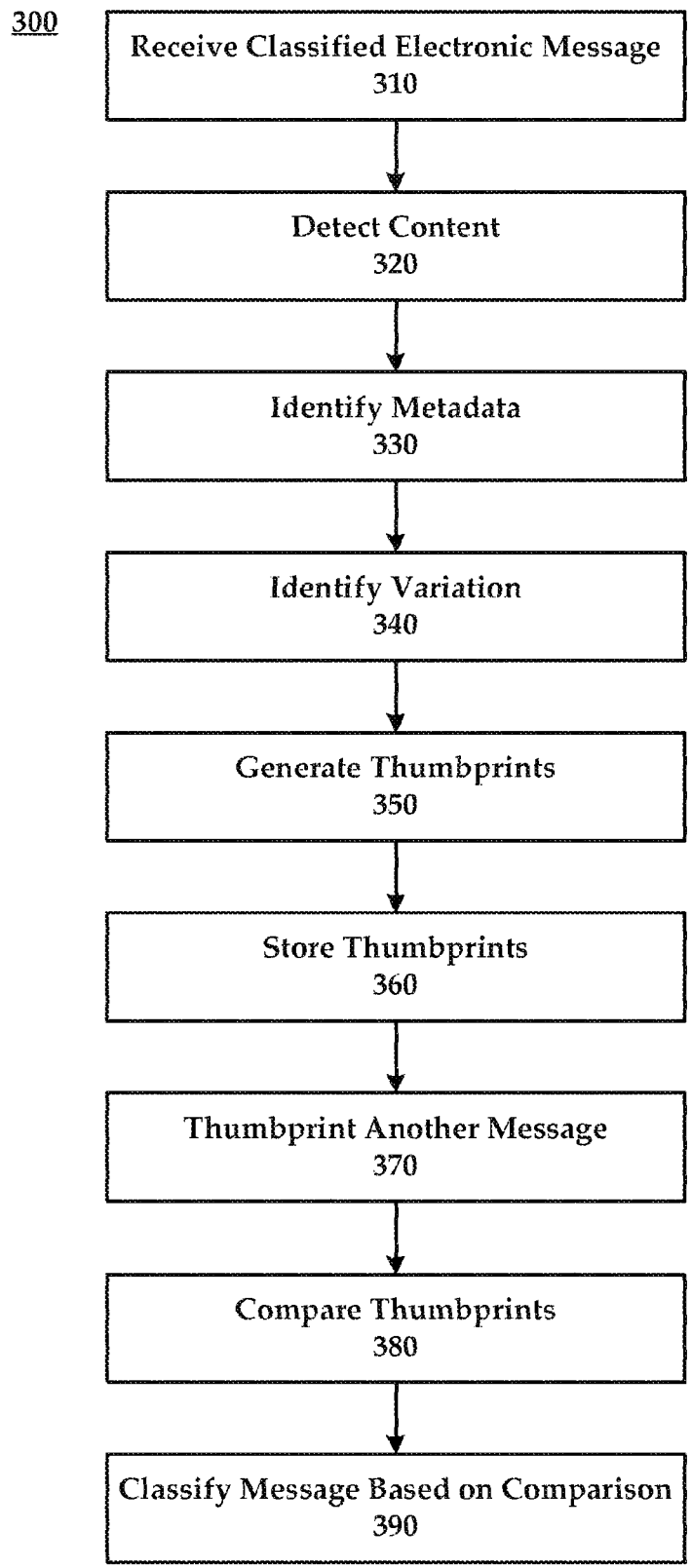
FIG. 3 illustrates a method for identifying content in electronic messages.

FIG. 3 illustrates a method 300 for identifying content in electronic messages. In the method 300 of FIG. 3, a classified electronic message is processed and content is detected. Metadata is identified and any corresponding variation. Thumbprints are then generated and stored in method 300 of FIG. 3. An unclassified message may be thumb printed and the thumbprints compared to those in storage. The unclassified message may then be classified based on the comparison.

In step 310, an indication regarding classification of an electronic message is received. The message may be classified as a spam (or not spam) message. This classification may be the result of the message coming from a known sender of spam messages or as a result of a user manually identifying a received message as spam upon review of the same. Classification may also have resulted from another entity on a network (global or local) having identified the message as being spam. Regardless of the means by which the message is initially classified as spam (not spam, or any other classification), the classified message is then routed to a detection engine 150 for thumb printing, as described in steps 320-360.

Content in the classified message is detected in step 320. Content filter 210, or a similar application, may detect one or more visual or image-based content in the classified message. The detected images are compared to select the largest one and may then be provided to metadata analyzer 220 for further analysis.

Each piece of visual or image-based content may then be examined to identify any metadata in step 330. Some types of images (e.g., GIF or PNG) may require specialized routines to extract the metadata associated with such images. The metadata extracted may refer to dimensional, color, authorship, and other characteristics of the visual or image content. A numerical signature may also be identified based on the metadata. In some cases, the values in the numerical signature may be rounded to a nearest integer or a multiple.

In step 340, at least one variation of the numerical signature is identified. The numerical signature may include any combination of the dimensional and/or color values characterizing the image. Any value may be adjusted in a variation. The amount of the adjustment may be in specified range from the original values.

In step 350, thumbprints are generated based on the numerical signature by thumbprint generator 230. In addition, thumbprints may be generated based on the variations of the numerical signature. Thumbprinting the variations in addition to the original numerical signature allows detection engine 150 to determine that an image is associated with identified spam in spite of any changes to the visual or image content since the identification.

In step 360, the thumbprints are provided to thumbprint database 160 for storage and comparison to subsequently received messages. Such subsequently received messages may then be classified as to whether they are spam or not spam based on matches or lack of matches to thumbprints associated with classified messages.

In step 370, another message is thumbprinted by thumbprint generator 230. Specifically, the thumbprint(s) of the other message is compared to the thumbprints of the classified message stored in thumbprint database 160. Thumbprints for the other message may be based on an original numerical signature, a rounded numerical signature, and/or determined variation(s) of the original or rounded numerical signature.

In step 380, the thumbprints of another message may then be compared to those thumbprints associated with the classified message stored in thumbprint database 160. The comparison may reveal a match with a thumbprint of the message that had been previously classified as spam.

In step 390, the other message may then be classified by classifier 240 as spam and/or part of a common spam outbreak based on the results of the comparison. In some instances, the other message may have already been classified as spam. The match with the classified message, however, may trigger an evaluation as to whether there is a spam outbreak. A spam outbreak may be identified based on a number of messages that are found to share a thumbprint with the message classified as spam.

Figure 4:
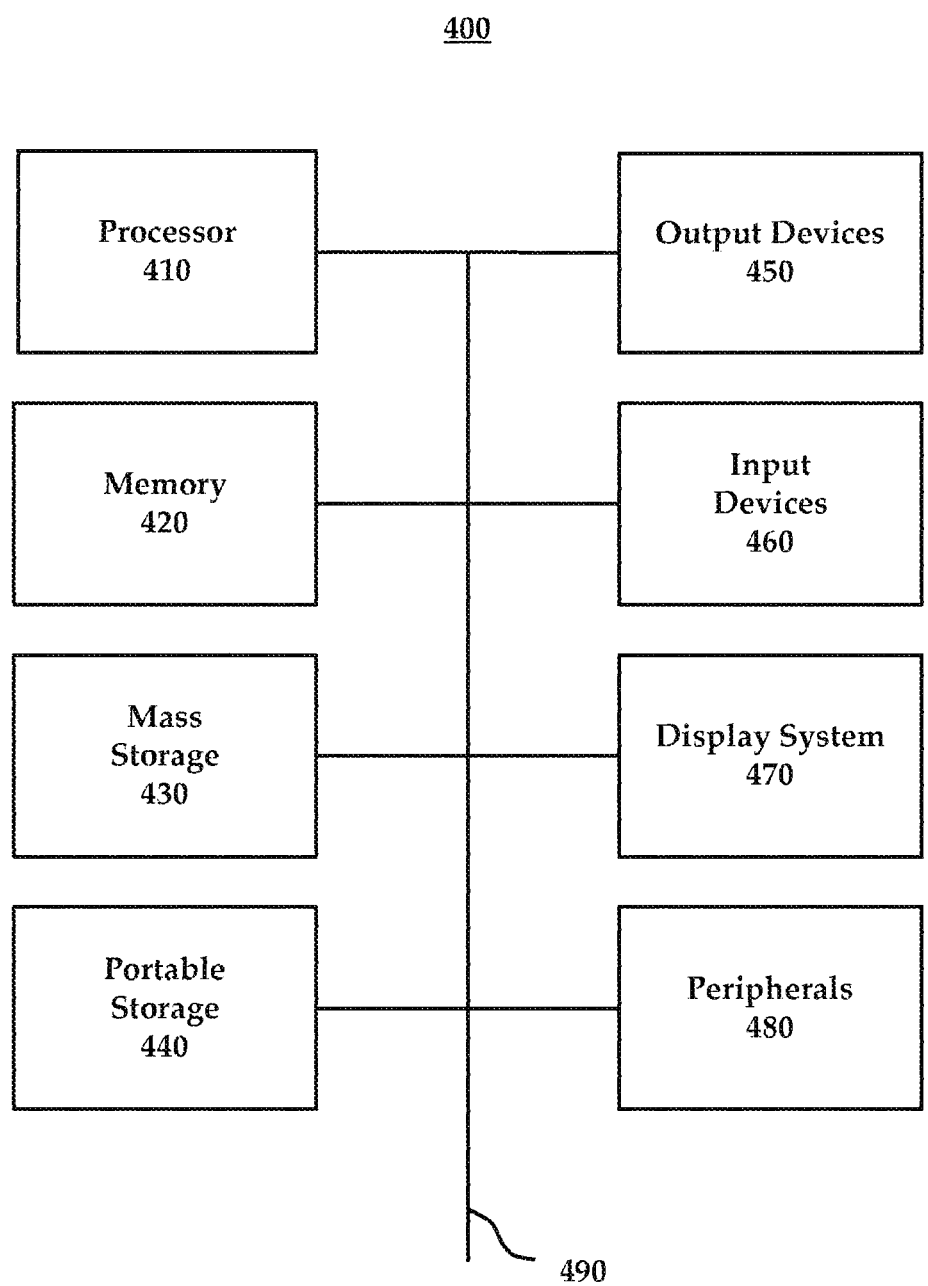
FIG. 4 illustrates a computing system that may be used to implement the detection engine of FIG. 2.

FIG. 4 illustrates a computing system 400 that may be used to implement the detection engine of FIG. 2. Computing system 400 may be representative of a network device as referred to in FIG. 1 and hosting the aforementioned detection engine 150. More specifically, the system 400 may execute a program embodied on a computer-readable storage medium to perform a method for identifying content in electronic messages. The computing system 400 of FIG. 4 includes one or more processors 410, memory 420, mass storage 430, portable storage 440, output devices 450, input devices 460, display system 470, and peripherals devices 480, which may be connected by a bus 490.

Main memory 420 stores, in part, instructions and data for execution by processor 410. Main memory 420 can store the executable code when in operation.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or digital video disc, to input and output data and code to and from the computer system 400 of FIG. 4. The system software for implementing embodiments of the present invention may be stored on such a portable medium and input to the computer system 400 via the portable storage device 440.

System 400 further includes output devices 450. Examples of output devices include speakers, printers, network interfaces, and monitors. Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. An input device, in some instances, may be a network interface.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router or some other network interface.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable storage device 440, and display system 470 may be connected via one or more input/output (I/O) buses.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX™, LINUX™, WINDOWS™, MACINTOSH™ OS, PALM™ OS, and other suitable operating systems.

Computer-readable storage media refer to any medium or media that participate in providing instructions to a central processing unit (CPU) (e.g., processor 410) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge, which may be part of main memory 420, mass storage 430, or portable storage 440

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. For example, analysis of metadata associated with an image may be used in the context of a search application implemented at a client device where a user searches for particular content or images or similar content or images using a thumbprint that might be stored in a database. Thus, the breadth and scope of a preferred embodiment should not be limited by any of the above-described exemplary embodiments.

What is claimed is:

1. A method for filtering messages, the method comprising:
    receiving a first electronic message via a network interface, the first electronic message including a first document file;
    extracting a first metadata dataset characterizing the first document file;
    retrieving a second metadata dataset from a database, the second metadata dataset characterizing a second document file included in a second electronic message;
    identifying that the first metadata dataset matches the second metadata dataset within a previously specified margin of error, wherein the previously specified margin of error represents a previously specified range of variations between the first metadata dataset and the second metadata dataset; and classifying the first electronic message as spam in response to the identification that the first metadata dataset matches the second metadata dataset within the previously specified margin of error.

2. The method of claim 1, wherein the first document file is a portable document format (PDF) file.

3. The method of claim 1, wherein the first document file is a text file.

4. The method of claim 1, wherein the first document file is a spreadsheet file.

5. The method of claim 1, wherein the first document file is a rich text file.

6. The method of claim 1, wherein the first document file includes at least one of video or audio.

7. The method of claim 1, wherein the first metadata dataset identifies an author of the first document file.

8. The method of claim 1, wherein the first metadata dataset identifies a date that the first document file was created.

9. The method of claim 1, wherein the first metadata dataset identifies a date that the first document file was modified.

10. The method of claim 1, wherein the first metadata dataset identifies a size of the first document file.

11. The method of claim 1, wherein the first metadata dataset identifies a dimension of the first document file.

12. The method of claim 1, wherein the first metadata dataset identifies one or more colors within the first document file.

13. The method of claim 1, wherein the first metadata dataset identifies at least a subset of the content of the first document file.

14. The method of claim 1, wherein the first metadata dataset includes a numerical value characterizing the content of the first document file.

15. A system for filtering messages, the system comprising:
    a communication transceiver that receives a first electronic message over a communication network, the first electronic message including a first document file;
    a memory that stores instructions; and
    a processor, wherein execution of the instructions by the processor causes the system to:
        extract a first metadata dataset characterizing the first document file,
        retrieve a second metadata dataset from a database, the second metadata dataset characterizing a second document file included in a second electronic message,
        identify that the first metadata dataset matches the second metadata dataset within a previously specified margin of error, wherein the previously specified margin of error represents a previously specified range of variations between the first metadata dataset and the second metadata dataset, and
        classify the first electronic message as spam in response to the identification that the first metadata dataset matches the second metadata dataset within the previously specified margin of error.

16. The system of claim 15, wherein the system is a network device, wherein the network device is communicatively coupled to a client device, and wherein the network device implements a firewall protecting the client device.

17. The system of claim 15, wherein the system is a server implementing a service used by a client device.

18. The system of claim 15, wherein the first document file is selected from a group including a portable document format (PDF) file, a text file, a spreadsheet file, a rich text file, a video file, and an audio file.

19. A method for filtering audiovisual content, the method comprising:
    receiving a first electronic message via a network interface, the first electronic message including a first video file;
    extracting a first metadata dataset characterizing the first video file;
    retrieving a second metadata dataset from a database, the second metadata dataset characterizing a second video file included in a second electronic message;

identifying that the first metadata dataset matches the second metadata dataset within a previously specified margin of error, wherein the previously specified margin of error represents a previously specified range of variations between the first metadata dataset and the second metadata dataset; and classifying the first electronic message as spam in response to the identification that the first metadata dataset matches the second metadata dataset within the previously specified margin of error.

20. The method of claim 19, wherein at least one of first video file or the second video file includes audio.

* * * * *